UNITED STATES PATENT OFFICE.

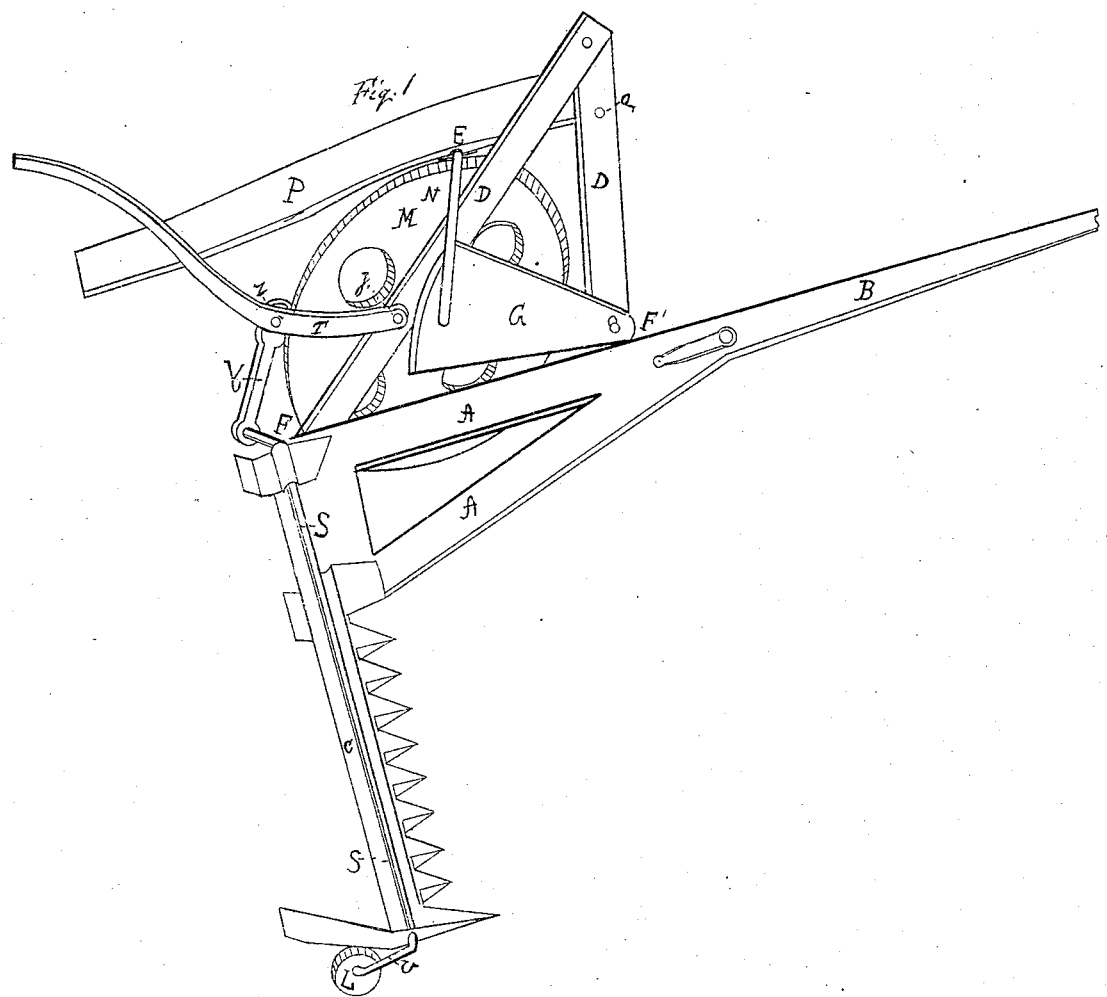

JAMES H. MAYDOLE, OF EATON, NEW YORK.

IMPROVEMENT IN HARVESTING-MACHINES.

Specification forming part of Letters Patent No. 29,504, dated August 7, 1860.

*To all whom it may concern:*

Be it known that I, JAMES H. MAYDOLE, of Eaton, in the county of Madison and State of New York, have invented a new and useful Improvement in Harvesters; and I do hereby declare that the following is a full, clear, and exact description thereof, reference being had to the annexed drawing, and to the letters of reference marked thereon, making a part of this specification.

The figure represents my improved harvester in perspective.

The nature of my invention consists in the employment and use of two adjustable wheels, M and L, (said wheels of themselves forming the only ground-support,) so combined with the frame of a harvester, and in such relative relation to each other and the frame and finger-bar, as that by the use of levers P and T and the parts in connection with them, or their equivalents, either end of the finger-bar may be elevated from the ground independent of the other, or the entire finger-bar, as circumstances may require.

To enable others skilled in the art to make and use my invention, I will proceed to describe its construction and operation.

A A represent the main frame of the machine; B, the draft-pole; C, the finger-bar; D D', two standards rigidly connected to the frame at F F'.

G represents an arm or lever pivoted to standard D' at O. To the rear of arm or lever G the driving-wheel M is connected by rod N, which said rod extends upward on each side of said wheel and is connected to lever P at E. Lever P is also pivoted to standard D' at Q, and extends backward over wheel M in rear of machine.

T represents a lever pivoted to standard D at *j*. Said lever extends backward and upward. Its position is nearly parallel vertically with that of lever P.

Y represents a bridle-piece pivoted at its upper end to lever T at Z.

S represents a rod of iron extending the entire length of the finger-bar. On the outer end of said rod is a crank, V. To said crank is pivoted a roller or wheel, L. Rod S has also an elbow or crank at its inner end, which said crank is pivoted to bridle-piece Y.

From the foregoing description and by reference to the drawing it will be seen that the finger-bar C may rest entirely upon the ground when desired. It will also be seen that by depressing lever T rod S is rotated, and wheel or roller L is brought in contact with the ground, thereby elevating the outer end of the finger-bar while the inner end is allowed to rest upon the ground.

When it is desirable to elevate the inner end of the finger-bar lever P may be depressed, said lever acting upon the wheel M as a fulcrum. To effect an elevation of the entire finger-bar and rear part of frame A, the two levers P and T may be depressed by an attendant while the machine is in operation.

Having thus described my invention, what I claim as new, and desire to secure by Letters Patent, is—

The arrangement and combination of mechanism, substantially as herein described, whereby either end of the finger-bar may be elevated from the ground independent of the other, or the entire finger-bar, by an attendant, substantially as described, and for the purposes set forth.

JAMES H. MAYDOLE.

Witnesses:
JOHN T. WHITNEY,
C. W. BURRITT.